United States Patent [19]

Baumberg

[11] Patent Number: 4,625,242
[45] Date of Patent: Nov. 25, 1986

[54] METHOD OF AND SYSTEM FOR REPRESENTING INFORMATION DATA

[76] Inventor: Iosif Baumberg, 54 Bay 29 St., Brooklyn, N.Y. 11232

[21] Appl. No.: 726,665

[22] Filed: Apr. 24, 1985

[51] Int. Cl.4 .............................................. H04N 5/30
[52] U.S. Cl. .................................................. 358/209
[58] Field of Search ............... 358/209, 217, 212, 213; 382/66

[56] References Cited

U.S. PATENT DOCUMENTS 2,904,629  9/1959  Scherbatskoy ...................... 358/217
3,002,125  9/1961  Stevens et al. ....................... 358/217
3,429,990  2/1969  Hobrough ............................ 358/217
4,011,401  3/1977  Presti .................................... 358/212

Primary Examiner—Gene Z. Rubinson
Assistant Examiner—Stephen Brinich
Attorney, Agent, or Firm—Ilya Zborovsky

[57] ABSTRACT

In accordance with a method of and a system for representing of information data, the information data are interrogated by a movable interrogating element, a flow of impulses is formed in correspondence with the data which have been interrogated by the interrogating element, and the interrogating element is moved successively in directions selected in response to commands formed by the impulses in directions selected from more than two directions, and the movement of the interrogating element is used for respective purposes.

16 Claims, 3 Drawing Figures

METHOD OF AND SYSTEM FOR REPRESENTING INFORMATION DATA

TECHNICAL FIELD

The present invention relates to a method of and a system for representing information data, particularly those involving scanning of information data.

Methods and systems of the above-mentioned type are widely known, for example in television, radiolocation, roentgenography, radioisotope analysis, storage tubes of computer memory. Scanning of the respective information data is here performed for respective use.

BACKGROUND ART

In transmitting and receiving systems, it is known to use a two-dimensional or raster scanning. This scanning has some defects, especially in orthogonal coordinate system, such as follows: Scanning along one of the coordinate axis, particularly along the Y-axis is interrupted so that the data, for example the image in television systems is transmitted in separate lines with fixed ordinates. There is no functional dependence between the tightness of scanning lines, the area of a pictured element, and the quantity of information in the transmitted image. this leads to the limitation of resolving power of the television systems. Transmission and reproduction of the image of the objects in separate lines with fixed ordinates and with synchronization in time leads to flickering of parts of the image of transmitted object. It is necessary to interrupt the beam after finishing of each line and to return the beam to its initial position by means of special units. For improving the quality of image each frame is divided in two semiframes, and because of complicated equipment the frames are not divided into a greater number of frame fragments.

DISCLOSURE OF THE INVENTION

In accordance with the present invention, a method is provided in which scanning of information data is performed by interrogating the information data with a movable interrogating element, forming a flow of impulses corresponding to the data which have been interrogated, and moving the interrogating element successively in directions selected in response to commands formed by the impulses from more than two directions with an equal probability, The invention also provides a system which has a scanning device for scanning the information data and including means for interrogating the information data formed as an interrogating element, means forming a flow of impulses corresponding to the information data which have been interrogated by the interrogating element, means forming commands in response to the impulses for moving the interrogating element successively in directions selected from a plurality of directions in random behavior with equal probability, and means for receiving the commands and moving the interrogating element in correspondence with the commands; and a device for using the movement of the interrogating element, for specific purposes.

A reproducing element can move in synchronism with the movement of the interrogating element.

For television systems this means that an electron beam in a transmitting device moves and interrogates the information, the information which has been interrogated is converted into a flow of impulses which form commands for changing the movement of the electron beam in directions selected from more than two directions with equal probability, for example along rectilinear paths. This takes place in a television tube of the transmitting device. On the other hand, in a television tube of a receiving device a reproducing electron beam moves in synchronism with the movement of the interrogating electron beam of the transmitting device and reproduces the information.

For radiolocation systems, roentgenographic systems, radioisotope scanning systems, storage tubes of computer memories, the moving elements are respectively electron beams, sensors of X-ray intensity, counters of radiation, and electron beams.

The novel features of the present invention are set forth in particular in the appended claims. The invention itself, however will be best understood from the following description of preferred embodiments which is accompanied by the following drawings.

BEST MODE FOR CARRYING OUT THE INVENTION

Figure 1:
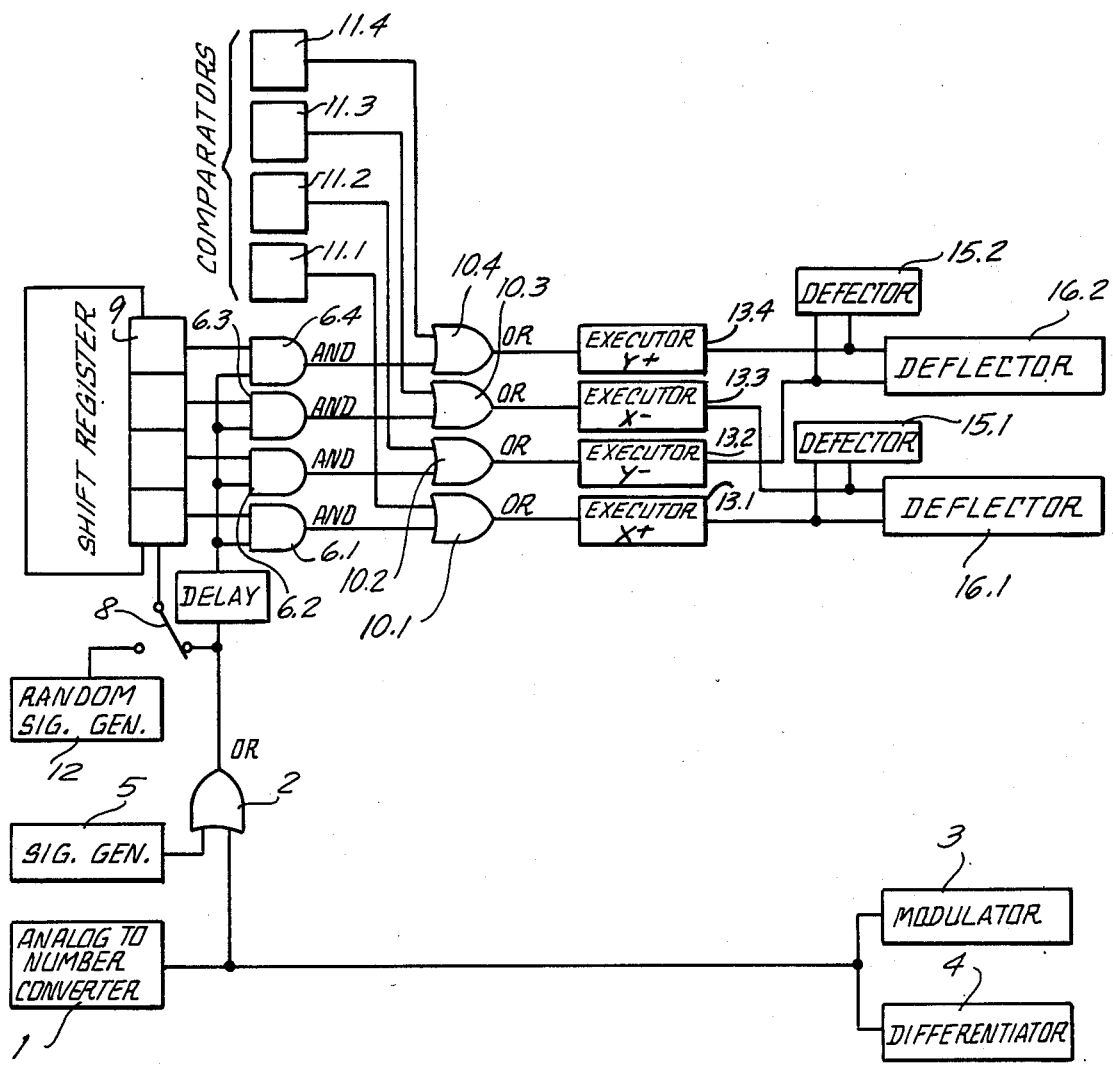
FIG. 1 is a view showing a transmitting-receiving system in accordance with the present invention.

A television system in accordance with the present invention is shown in FIG. 1. It has analog-to-number convertor identified with reference numeral 1. The convertor 1 converts an analog value of videosignal received for example from iconoscope into a flow of impulses. The output of the convertor 1 is connected with a first input of a logic gate OR identified with reference numeral 2, It is also connected with a modulating unit 3 of a picture tube (kinescope) of a receiving device, and with a differentiating unit 4 of the receiving device, for the purposes which will be explained hereinbelow.

An output of a random signal generator 5 which supplies a flow of impulses randomly distributed in time, is connected with a second input of the logic gate OR. An output of the logic gate OR is connected with first inputs of n logic elements AND 6.1, 6.2, 6.3, 6.4 through a delay unit 7. For scanning in orthogonal coordinate system with n=4 there are four such AND gates. The output of the gate OR is connected to the first inputs of all four gates AND.

Reference numeral 9 identifies a circular channel allocation device (shift register). The output of the logic gate OR is also connectable with the channel allocation unit 9 which has, respectively, n=4 channels. An output of each channel of the channel allocation unit 9 is connected with a second input of the respective logic AND gate 6.1, 6.2, 6.3, 6.4. An output of each logic gate AND is connected with an output of a respective one of n=4 logic gates OR 10.1, 10.2, 10.3, 10.4. A second input of each logic gate OR 10.1, 10.2, 10.3, 10.4 is connected with an output of a respective one of n=4 comparator units 11.1, 11.2, 11.3, 11.4 with an indicator of a threshold value.

By means of a switch 8, a driver input of the circular channel allocation unit 9 can be connected either with the first logic gate OR or with a second random signal generator 12 which supplies a flow of impulses randomly distributed in time. An output of each logic gate 10.1, 10.2, 10.3, 10.4 is connected with an input of a respective one of n=4 executing units 13.1, 13.2, 13.3, 13.4. The executing units are formed for example as normally open conttolled electronic switches. The executing units are connected with for example two defecting units 15.1 and 15.2. The executing units 13.1 and 13.3 are connected with the deflecting unit 15.1 which deflects the electron beam along the axis of abscissa. The executing units 13.2 and 13.4 are connected with the deflecting unit 15.2 which deflects the electron beam along the axis of ordinate. In the given example of the television system, electron beam deflection, for example electrostatic deflection, magnetic deflection etc. Each of the executing units serves for turning the deflecting unit for deflecting the electron beam to one fixed direction $X^+$, $X^-$, $Y^+$, $Y^-$, in orthogonal coordinate system, in the transmitting device A and in the receiving device B. For this purpose the deflecting units 15.1 and 15.2 are connected respectively with the deflecting units 16.1 and 16.2 of the receiving device B.Or the executing unit are connected to the latter.

OPERATION

Figure 2:
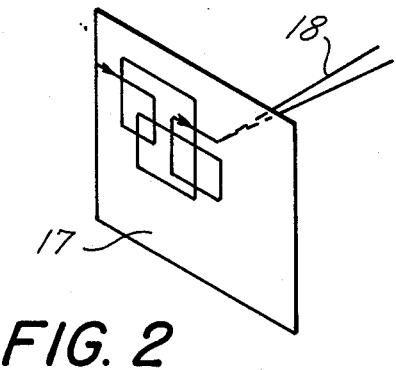
FIGS. 2 and 3 are views showing two different patterns of movement of a moving interrogating-reproducing element in accordance with the present invention.

The transmitting-receiving system of television in accordance with the present invention operates in the following manner:

For operation in a mode of consecutive running, the switch 8 connects the gate OR 2 with the circular allocation unit 9. The inpulse flow from the convertor 1 and the impulse flow from the random signal generator 5 are united in the gate OR 2 and a united flow of impulses is supplied into the unit 9 and also to the first input of the AND gates 6.1–6.4 through the delay unit 7. All impulses are received into all first inputs of the AND gates, and the impulses are received in the respective sequence through the unit 9 into the second inputs of the respective gates AND. When the impulses in both inputs of the respective gate AND coincide with one another, the impulse is supplied into the respective executing unit 13.1–13.4 of the transmitting device A (through the respective gate AND, and the executing units switch the respective deflecting unit 15.1, 15.2 to deflect the electron beam in the transmitting device A (in the iconoscope), and also the respective deflecting unit 16.1, 16.2 in the receiving device (in the kinescope) as shown in FIG. 2. The directions of the electron beam are changed consecutively parallel to the respective coordinate axes, with an equal probability. FIG. 2 shown the movement of the electron beam in clockwise direction, wherein 17 is a part of a target of the screen, and 18 is an electron beam.

Figure 3:
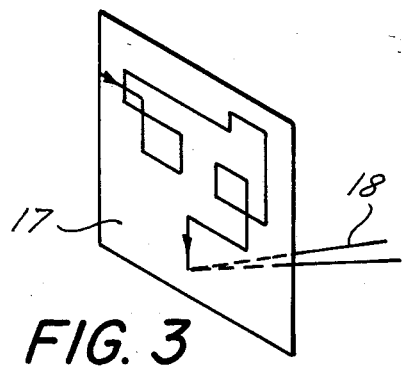

When the switch 6 connects the random signal generator 12 with the circular allocation unit 9, the system operates in accordance with a mode of random running. The channel allocation unit is selected so that an average statistic frequency of the impulses at its output is significantly greater than that of the impulses received from the gate OR 2. The impulses of the united flow after the gate OR 2 are supplied to the first inputs of the respective gates AND 6.1–6.4. Impulses from the random signal generator are also supplied to the circular allocation unit 9, and from the latter are supplied to the second input of the AND gates 6.1–6.4. From the AND gates the impulses are supplied to the respective executing units 13.1–13.4 in a random behavior with the equal probability $p=0.25$. When the random generator 12 is connected with the channel allocation unit 9, instead of the same flow of impulses from the convertor 1, the channel allocation unit receives a different flow of impulses, which results in random coincidence of the impulses in the AND gates 6.1–6.4 and random actuation of the executing units 13.1–13.4 which receive the impulses which are randomly distributed in time. Therefore, the electron beam changes its direction (under the action of the deflecting units 15.1, 15.2 and 16.1, 16.2) parallel to the respective axes, and not consecutively always in clockwise or counterclockwise direction, but instead in any random behavior as shown in FIG. 3.

Each second input of the OR gates 10.1–10.4 is connected with the output of the respective units of comparison of threshold value 11.1–11.4. Each of these units forms an impulse when one of the coordinates of scanning reaches a threshold value for the respective unit, For example, if for abscissa of the scanning element the condition $x \leq x_1$ is satisfied, wherein $y=x_1$ is a straight line corresponding to the border of the scanned rectangular field, an impulse is formed in the unit 11.1. Then the impulse is transmitted from the output of the latter through the second input of the gate OR 10.1 to the input of the executing unit 13.1 which forms a command for changing the direction of scanning from $X^-$ to opposite direction $X^+$. The scanning (moving) element is "reflected" at a right angle from the left border of the scanned field.

When however for abscissa of the scanning element the condition $x \geq x_2$ is satisfied, wherein $x_1 < x_2$ and $y=x_2$ is a straight line corresponding to the right border of the scanned field, then an impulse is formed in the threshold unit 11.3. From the output of the latter the impulse is transmitted through the second input of the gate OR 10.3 to the input of the executing unit 13.3 which forms a command for changing the direction of scanning from $X^+$ to the direction $X^-$. The scanning (moving) element is "reflected" from the right border of the scanned field with a straight line $y=x_2$. Similar actions are performed for the threshold units 11.2 and 11.4, wherein $y<y_2$, $x=y_1$, and $x=y_2$ are equations of straight lines corresponding to the lower and upper borders of the scanned rectangular field. The above mentioned function distribution of the threshold units 11.1–11.4 and gates 10.1–10.4 as well as the executing units 13.1–13.4 corresponds the scanning in clockwise direction.

It is to be understood that the electron beam can also move in counterclockwise direction. It is also to be understood that the generator 5 can be omitted in some cases. In these cases the united flow is composed of only a main flow of impulses which for example for the television is a flow of impulses of the videosignal.

When the method is performed and the system is designed in accordance with the present invention, the scanning is performed not by subdividing of an image into individual separate lines, half-frames and frames, but by means of continuous scanning parallel to both coordinate axes. The density of lines of scanning and the area of an element of a frame changes as a function of a relative density of distribution of information in the frame. The reason for this is that the value of a signal (videosignal in television) is a function of the value of brightness of elements of the image which is transmitted, and also of their derivative, as will be explaned hereinbelow.

With the increase in quantity of transmitted information, the density of the lines of scanning is increased and the area of an element of scanning is decreased (or sharpness of focusing of electron beam on the screen is improved). Coordinates of the lines of scanning and the frequency of changing of the latter are not fixed and are random values both in the mode of random running and in the mode of consecutive running, since the value of signal (videosignal in television) changes during scanning as a function of random values of transmitted information. This eliminates flickering of individual parts of image, which takes place in raster scanning.

The frequency of forming the fragments of the lines between the successive impulses of the videosignal and alternating of these fragments parallel to the coordinate axes determine the density of the fragments of lines as a function of the signal (videosignal). The higher is the value of the signal, the higher is the density of the lines which are parallel to both coordinate axes.

The increase of a part of randomly distributed in time impulses in the united flow increases the number of formed fragments of a frame. Frame fragments with a higher quantity of information are repeated with higher frequency than the frame fragments with a lower quantity of information.

The dependence of the density of the fragments of lines and the number of subdivisions into parts of a frame can be improved if the signals for forming commands of direction switching or the random selection of scanning directions are formed as a function of a derivative of intensity of the brightness of elements of image. Movement of the scanning element (electron beam in television) from one line to the other and from one part of a frame to the other part is performed in the process of uninterrupted scanning of the image without extinguishing and returning of the scanning (moving) element to an initial abscissa or into an initial point, as in the case of the raster scanning.

It is to be understood that the units 3 and 4 are not necessary for the basic idea of the present invention and therefore can be omitted.

As can be seen from the drawing, the modulating unit 3 in the receiving device B is connected with the output of the convertor 1. It receives the flow of impulses from the convertor 1 and sends the signals to a modulating electrode of the kinescope, so that the intensity of the electron beam and therefore the illumination of the elements of image on the screen change in dependence on the impulse flow.

The differentiating device 4 is also connected with the convertor 1 to receive the impulse flow, and is connected with a focusing electrode of the kinescope so that sharpness of focusing of the electron beam changes as a function of the impulse flow. In particular, when a greater quantity of information is scanned, the sharpness of focusing of the respective element of the image on the screen is increased.

It is to be understood that with different types of patterns of scanning, it is possible to use the inventive method and system in accordance with the present invention for both above described modes. It is also possible to provide not only two-dimensional, but also three- and multi-dimensional scanning.

The invention is not limited to the details shown since various modifications and structural changes are possible without departing in any way from the spirit of the present invention.

What is desired to be protected by Letters Patent is set forth in particular in the appended claims.

I claim:

1. A method of representing information data, comprising the steps of scanning information data, including interrogating information data by a movable interrogating element, forming a flow of impulses corresponding to the data which have been interrogated by said interrogating element, and moving said interrogating element successively in directions selected in response to commands formed in response to said impulses, from more than two directions with an equal probability.

2. A method as defined in claim 1, wherein said moving steps includes moving said interrogating element in directions selected in accordance with a predetermined sequence so that after moving said interrogating in a previous direction it moves in a predetermined subsequent direction.

3. A method as defined in claim 1, wherein said moving step includes moving said interrogating element in directions selected in accordance with a random pattern.

4. A method as defined in claim 1, wherein said scanning step includes uniting the flow of impulses corresponding to the data, with a further flow of randomly distributed in time impulses so as to form a united flow of impulses, said moving step including moving the interrogating element in directions selected in response to commands formed by the impulses of the united flow of impulses.

5. A method as defined in claim 1; further comprising the step of providing a reproducing element and moving the latter in synchronism with the movement of said interrogating element.

6. A method as defined in claim 5, wherein said scanning step includes determining a derivative of the flow of impulses corresponding to the information data; and further comprising the step of focusing the reproducing element in accordance with the derivative of the flow of impulses corresponding to the information data.

7. A method as defined in claim 1; and further comprising the step of limiting the movement of the interrogating element and including forming a limiting impulse and supplying the limiting impulse to the interrogating element so as to limit the movement of the latter.

8. A method as defined in claim 5; and further comprising the step of varying illumination of an image reproduced by the reproducing element, in dependence upon the flow of impulses corresponding to the information data.

9. A system for representing information data, comprising a scanning device for scanning information data and including means for interrogating the information data and formed as a movable interrogating element, means for forming a flow of impulses corresponding to the information data which have been interrogated by said interrogating element, means forming commands in response to the impulses for moving said interrogating element successively in directions selected from more than two directions with equal probability, and means for receiving said commands and moving said interrogating element in correspondence with the latter.

10. A system as defined in claim 9, wherein said command forming means includes means for forming commands to move said interrogating element in accordance with a predetermined sequence so that after moving said interrogating element in a previous direction it moves in a predetermined subsequent direction.

11. A system as defined in claim 9, wherein said command forming means includes means for forming commands to move said interrogating element in accordance with a random pattern.

12. A system as defined in claim 9, wherein said command means includes means for forming the command for moving said interrogating element in each direction in response to each impulse of said flow of impulses.

13. A system as defined in claim 9; and further comprising means for forming a further flow of impulses; and means for uniting said first mentioned flow of impulses with said further flow of impulses so as to form a united flow of impulses, said command forming means being arranged to form commands in response to the impulses of said united flow of impulses.

14. A system as defined in claim 13; and further comprising means for differentiating said flow of impulses corresponding to the information data to form a derivative; and means for focusing said reproducing element in accordance with the derivative of the flow of impulses corresponding to the information data.

15. A system as defined in claim 9; and further comprising means for limiting the movement of said interrogating element including means for forming a limiting impulse and means for supplying the limiting impulse to said interrogating element so as to limit the movement of the latter.

16. A system as defined in claim 13; and further comprising illuminating means connected with said means for forming a flow of impulses and varying the illumination of an image reproduced by said reproducing element in accordance with said flow.

* * * * *